May 13, 1924.

D. N. ANDERSON

CAKE OR BAKING TIN

Filed Sept. 13, 1920

1,493,796

INVENTOR
DAVID N. ANDERSON

BY *[signature]*
ATTYS.

Patented May 13, 1924.

1,493,796

UNITED STATES PATENT OFFICE.

DAVID NATHANIEL ANDERSON, OF VANTAGE, SASKATCHEWAN, CANADA.

CAKE OR BAKING TIN.

Application filed September 13, 1920. Serial No. 409,900.

*To all whom it may concern:*

Be it known that I, DAVID NATHANIEL ANDERSON, a citizen of the United States of America, resident of the town of Vantage, Province of Saskatchewan, Dominion of Canada, have invented certain new and useful Improvements in Cake or Baking Tins, of which the following is a specification.

This invention relates to improvements in cake or baking pans, and the object of the invention is to facilitate removing a cake, loaf or any article of confectionery from the bake or cake pan after the said article has been cooked.

The invention consists essentially of the improved construction and arrangement of parts particularly described in the following specification and accompanying drawing forming part of the same.

In the drawings.

Like characters of reference refer to like parts in the several figures.

Figure 1:
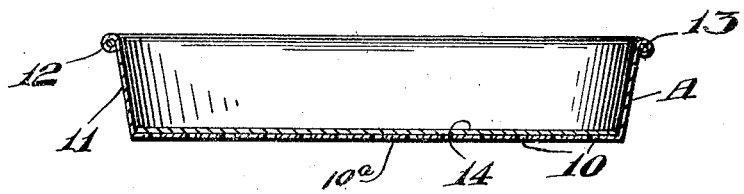
Figure 1 is a transverse section of a baking or cake pan embodying my invention.
Figures 2, 3:
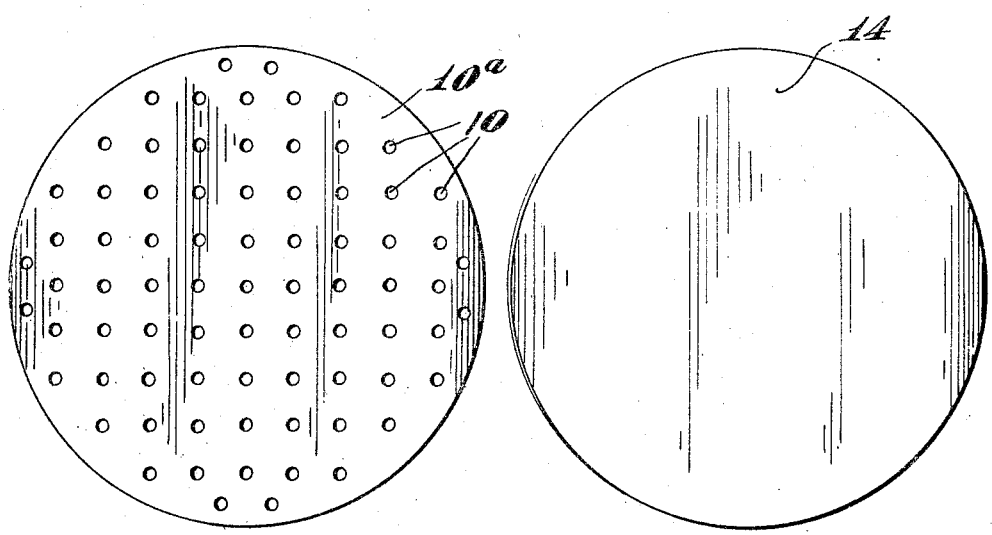
Figure 2 is a plan view of the bottom of the baking pan.
Figure 3 is a plan view of a removable bottom of the baking or cake pan.

Referring to the drawings; A represents a baking or cake pan having a perforated bottom 10 and an angularly-disposed lateral wall 11, the upper end 12 of which is curled and reinforced by a wire 13.

A removable bottom plate 14 is provided which may be inserted in the pan.

When this pan is in use, the bottom 14 is placed above the perforated bottom 10, and the batter, cake or other mixture is poured into the pan and then placed in an oven for cooking.

When the article or cake has been cooked and the pan A has been removed from the oven, then the cake may be removed from the pan A with ease, and the removable bottom 14 will be attached to the bottom of the cake.

The bottom 14 can then be removed easily by passing a knife or other suitable blade between the bottom 14 and the cake. The heat is allowed to readily pass through the fixed bottom 10ª to the removable bottom 14, and to this end the orifices 10 may be made of varying size. The orifices 10 may also be used to permit a pin or rod being inserted in an orifice to push the cake out of the pan A.

As many changes could be made in the above construction and many widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A pan of the class described having a perforated bottom, a side wall slanting outwardly and terminating in a curled edge, a wire hoop reinforcing the curled edge, and a metal disc loosely bearing on the perforated bottom, as and for the purpose described.

In witness whereof I have hereunto set my hand in the presence of two witnesses.

DAVID NATHANIEL ANDERSON.

Witnesses:
G. O. BERGSTUL,
C. P. ARCHER.